United States Patent [19]

Garrido et al.

[11] Patent Number: 5,349,854
[45] Date of Patent: Sep. 27, 1994

[54] ELEVATOR SPEED AND POSITION INDICATING DEVICE

[75] Inventors: Alfonso Garrido; Jose Sevilleja, both of Madrid, Spain

[73] Assignee: Otis Elevator Company, Farmington, Conn.

[21] Appl. No.: 877,307

[22] Filed: May 1, 1992

[51] Int. Cl.[5] .......................... G01P 3/18; B66B 5/04
[52] U.S. Cl. ...................................... 73/490; 73/493; 73/535; 187/134
[58] Field of Search ................ 73/490, 493, 494, 535; 187/89, 130, 134, 136

[56] References Cited

U.S. PATENT DOCUMENTS

| | | | |
|---|---|---|---|
| 1,275,673 | 8/1918 | Hajek | 187/89 |
| 3,872,949 | 3/1975 | Snyder | 187/89 |
| 4,311,212 | 1/1982 | Simpson | 187/130 |
| 4,427,095 | 1/1984 | Payne et al. | 187/134 |

*Primary Examiner*—John E. Chapman

[57] ABSTRACT

An elevator speed and positioning device includes an elongated member and a rotating disk. The elongated member includes an apparatus for indicating position along the member and the disk includes an apparatus for communicating the indicating apparatus. A constant relationship exists between the elongated member and the disk such that relative positions between the two are repeatable. The relative motion between the elongated member and the disk may be quantified to determine the relative position of the elevator car.

1 Claim, 3 Drawing Sheets

ELEVATOR SPEED AND POSITION INDICATING DEVICE

TECHNICAL FIELD

This invention relates to elevator control devices and more particularly to elevator speed and positioning control devices.

BACKGROUND ART

Elevator control and safety requirements dictate that the speed and position of an elevator car must be monitored accurately. Knowing the speed of an elevator car is important for control purposes. For example, calculating the elevator car travel time or the travel distance necessary for proper deceleration or acceleration both require an accurate rate of speed value. Knowing the position of the elevator car is also important for control and safety purposes. Accurate positional data for the elevator car, for instance, is essential to ensure that the car aligns with each landing correctly. Moreover, knowing the position allows the control system to begin deceleration at the proper position, thereby allowing the car to stop smoothly at each landing.

Prior art teaches that elevator car speed may be monitored through a conventional governor rope assembly mainly comprising a governor rope, a governor sheave, a tension sheave, and mechanical linkages which operate safety brakes. The governor sheave typically employs a centrifugal device which engages a brake, producing a drag on the governor cable in an overspeed condition. If the overspeed condition persists, the a second independent safety brake system mechanically deploys and the elevator car is safely brought to a halt.

A disadvantage of this type speed control system is the frictional wear which naturally occurs in a governor rope assembly. The greatest problem with this type wear is that it is often visually undetectable. In addition, frictional wear also occurs during an overspeed braking condition. Eventually the frictional forces will wear the governor rope enough to necessitate replacement thereof.

A further disadvantage of a governor rope assembly is the required maintenance. The governor rope, the sheaves, and the linkages all must be periodically cleaned, lubricated, or replaced. All maintenance requirements are considered a burden to those skilled in the art, and therefore represent an undesirable feature in an elevator system.

Prior art discloses an elevator positioning system independent of the elevator speed control. Conventional positioning systems typically include a sheave located in the machine room of the elevator and a perforated tape running up from the elevator car, wrapping around the sheave, and back down to the counterweight. The perforated tape travels up and down with the elevator, rotating about the sheave. A disadvantage of this type positioning system is the fatigue created in the tape by the constant wrapping of the tape around the circumference of the sheave.

A disadvantage of the aforementioned prior art is that the speed and monitoring systems are independent from one another. Two independent systems create a redundancy in some of the required hardware as well as a greater demand of hoistway space.

DISCLOSURE OF THE INVENTION

Therefore, it is an object of the present invention to combine the speed and position sensing devices of an elevator.

It is a further object of the present invention to reduce the amount of hardware in the hoistway for sensing speed and position of an elevator car.

It is a still further object of the present invention to reduce the amount of maintenance required for the speed and position sensing devices of an elevator.

According to the present invention, an apparatus for detecting the speed and position of an elevator is provided, comprising an elongated member and a rotating disk. The elongated member includes means for indicating position along the member and the disk includes means for communicating with the indicating apparatus. A constant relationship exists between the elongated member and the disk such that relative positions between the two are repeatable. The relative motion between the elongated member and the disk may be quantified to determine the relative position of the elevator car.

An advantage of the present invention is that a single device replaces two conventionally employed devices. The present invention combines the speed and position indicator devices conventionally employed into a single device. As a result, the duplication of hardware can be avoided and a cost savings realized.

Furthermore, replacing both the governor rope and the position tape assemblies with the present invention's dual purpose embodiment provides a savings in valuable space in the hoistway.

A further advantage of the present invention is the decrease in required maintenance when the conventional independent speed and position devices are replaced by the present invention. Since the present invention requires no governor rope, the maintenance attributable to the rope is eliminated. In addition, the stationary means of the present invention does not rotate about the circumference of a sheave. As a result, the stationary means experiences less stress, which in turn, increases the life of the means. A person skilled in the field of elevator maintenance will appreciate that gains in maintenance efficiency are considered quite valuable and sought after by manufacturers.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
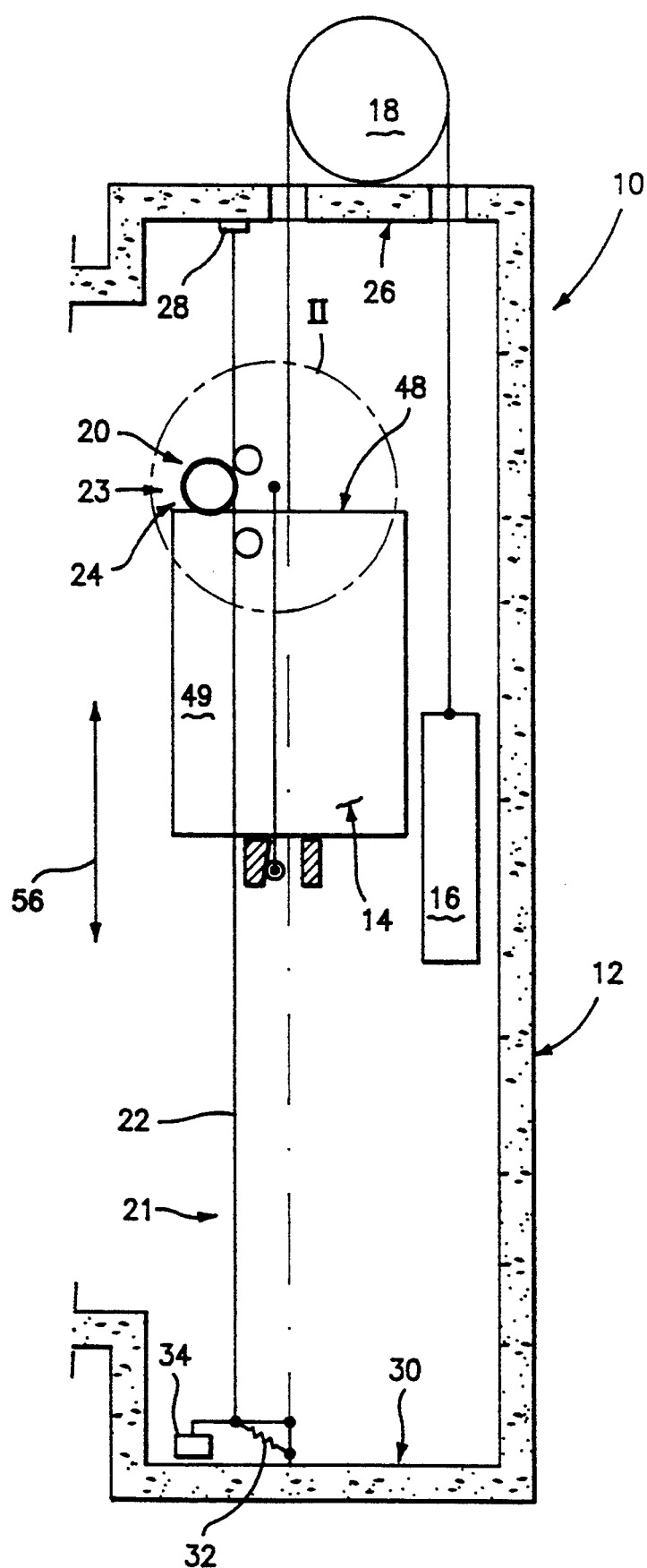
FIG. 1 shows a diagrammatic view of an elevator consisting of a hoistway, an elevator car, a counterweight, a motorized sheave, and the present invention, an elevator speed and positioning device.
Figure 2:
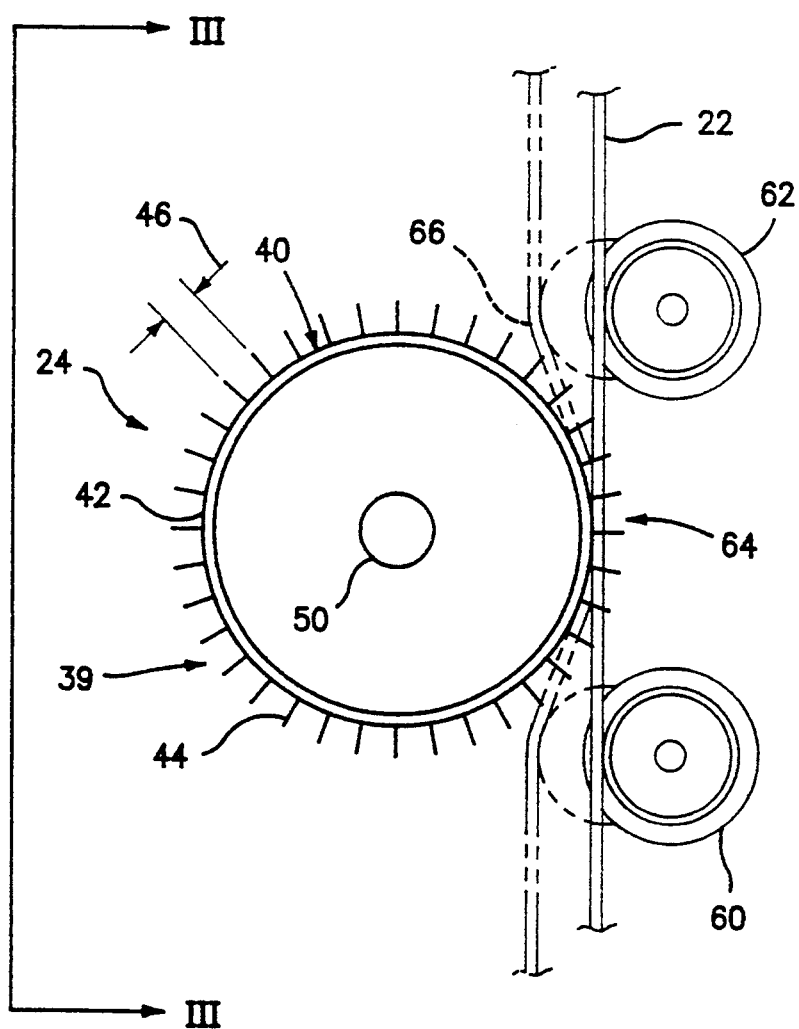
FIG. 2 shows an enlargement of the diagrammatic view of the elevator speed and positioning device shown in FIG. 1.
Figure 3:
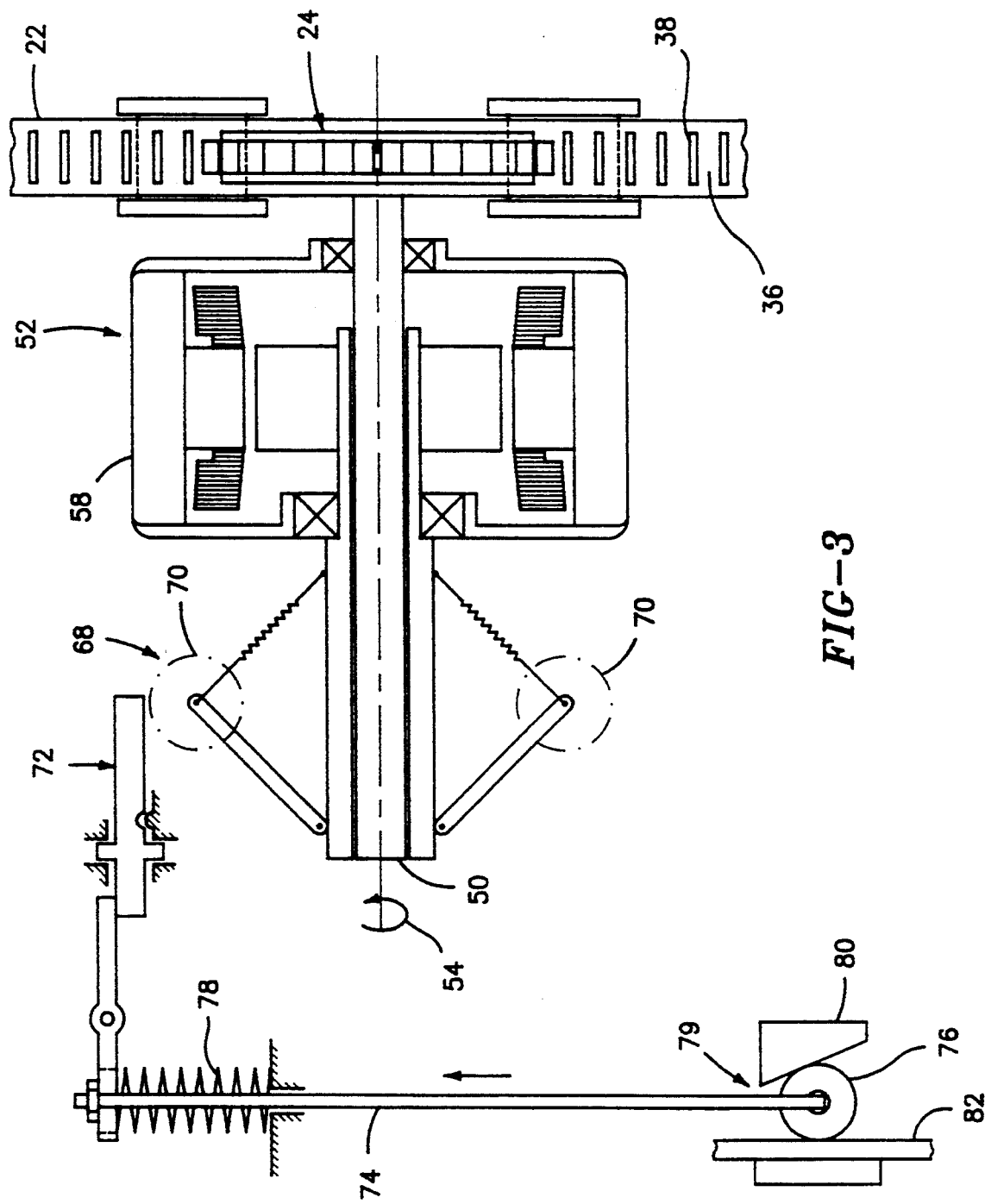
FIG. 3 shows a side view of the enlarged diagrammatic view of the elevator speed and positioning device shown in FIG. 2.

Now referring to FIG. 1, as commonly known in the art an elevator 10 comprises a hoistway 12, an elevator car 14, a counterweight 16, and motorized sheave 18. The elevator 10 further comprises a means 20 to sense elevator car speed and position within the hoistway. In this embodiment, the means 20 includes a stationary means 21 in the form of a perforated metallic elongated member 22 fixed within the hoistway, and a traveling means 23 in the form of a speed sheave 24 attached to the elevator car. Specifically, the elongated member may be a band, a rope, a rail, or the like.

The perforated metallic member 22 extends vertically throughout the hoistway 12. At the top 26 of the hoistway, the member 22 fixes to the hoistway by conventional means such as a bracket 28 bolted to the hoistway. At the bottom 30 of the hoistway, the member 22 attaches to a tensioner 32 which maintains a constant tension on the member. A safety switch 34 ensures the proper tension is maintained.

The member 22 comprises an indicating means 36, which in this embodiment includes regularly spaced perforations 38. The spacing of the perforations 38 allows the member to communicate with the speed sheave 24.

The speed sheave 24 comprises means 39 for communicating with the indicating means 36 of the member 22 in a constant relationship. In this embodiment, the means 39 comprises a circular disk 40 with an exterior surface 42 comprising a number of spaced teeth 44, outwardly extending from the exterior surface 42. The pitch 46 of the teeth corresponds to the linear spacing of the perforations 38 of the perforated metallic member 22, thereby allowing the member to freely receive the sheave teeth as the speed sheave 24 rotatably contacts the fixed metallic member 22. The speed sheave attaches to the top 48 of the elevator car 14, overhanging on a side 49, and consequently moves vertically up and down the hoistway 12 with the elevator car. Alternatively, the speed sheave may be attached to other surfaces of the elevator car or the counterweight 16.

The constant relationship between the indicating means 36 and the means 39 for communicating with the indicating means is such that the traveling means 23 may travel repeatedly from a particular point relative to the stationary means 21, but upon return the relationship between the two means is the same as it was originally. Phrased differently, what ever position is depicted by the indicating means 36 prior to the traveling means 23 moving, will be again depicted by the indicating means when the traveling means returns.

The speed sheave 24 further includes a pivot axle 50 which serves as a rotational axis for the circular disk 40. The pivot axle extends through the speed sheave 24 communicating with means 52 for quantifying the sheave's rotational motion 54 in terms of linear displacement 56 of the elevator car 14. The elevator car's rate of linear displacement may also be quantified by the means 52. The means 52 may comprise, for example, a magnetic rotary position sensor 58 commonly known in the art. The elevator car 14 will be displaced a defined distance for every rotation of the sheave 24. Each rotation, in turn, is sensed by a particular number of magnetic pulses passing by the sensor 58. From this information, the exact linear displacement of the elevator car can be determined by a computer (not shown). Alternatively, the position of an elevator car 14 relative to a stationary member 22 may be determined by an optical sensing means (not shown), or the like.

The speed sheave 24 still further includes a pair of rolling guide wheels 60,62 attached to the elevator car 14. One guide wheel is positioned on each side of the contact area 64 between the speed sheave 24 and the perforated member 22. The guide wheels 60,62 align the contact area 64 between the sheave 24 and the member 22. The guide wheels 60,62 may also be used to force the perforated member 22 into more than just tangential contact with the speed sheave. Depending on the application, it may be advantageous to "wrap" 66 the member 22 over a percentage of the speed sheave's circumference to reduce the loading on both the speed sheave teeth 44 and the member 22.

An overspeed device 68 attaches to the pivot axle 50 of the speed sheave 24. In this embodiment, the overspeed device 68 is a centrifugally operated mechanical device as is commonly known in the art. Such a device is disclosed in the reference book, "Elevators", by F. A. Annet, 3rd. Ed., pp. 87–89, 1989. When the linear speed of the elevator car 14, and consequently the rotational speed of the pivot axle, exceeds a predetermined value, the centrifugal overspeed device actuates a safety brake 79. In the embodiment shown, the flyballs 70 of the centrifugal overspeed device extend radially outward, contacting a mechanical linkage 72. The linkage, in turn, releases a spring loaded shaft 74 pivotly attached to a roller 76. When the spring 78 forces the shaft upward, the roller is drawn between a wedge 80 and a flat surface 82, thereby producing a braking force. Numerous other overspeed devices are known in the art and may alternatively be used here.

Although this invention has been shown and described with respect to the detailed embodiments thereof, it will be understood by those skilled in the art that various changes in form and detail thereof may be made without departing from the spirit and scope of the claimed invention.

We claim:

1. In an elevator comprising an elevator car and a hoistway, a means for sensing the speed and position of said elevator car within said hoistway, comprising:

an elongated member mounted in a stationary position within said hoistway of said elevator, said member having regularly spaced perforations;

a circular disk, having an exterior surface comprising a number of spaced teeth, having a pitch, said disk mounted on said elevator car for communicating with said regularly spaced perforations of said elongated member, wherein said pitch of said teeth corresponds to said regular spacing of said perforations, thereby allowing said elongated member to freely receive said teeth as said speed sheave rotatably contacts said member, and wherein said elongated member and said disk have a constant relationship such that relative positions between said elongated member and said disk are repeatable.

* * * * *